(12) United States Patent
Gill

(10) Patent No.: US 6,178,072 B1
(45) Date of Patent: Jan. 23, 2001

(54) KEEPER LAYER WITHOUT SENSE CURRENT SHUNTING IN A GIANT MAGNETORESISTIVE (GMR) HEAD

(75) Inventor: Hardayal Singh Gill, Portola Valley, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/188,419

(22) Filed: Nov. 9, 1998

(51) Int. Cl.[7] .................................................. G11B 5/39
(52) U.S. Cl. ........................................................ 360/324.11
(58) Field of Search .......................... 360/324.12, 324.11

(56) References Cited

U.S. PATENT DOCUMENTS 5,508,867 * 4/1996 Cain et al. .
5,742,162 * 4/1998 Nepela et al. ......................... 324/252
5,768,071 * 6/1998 Lin .
5,796,561 * 8/1998 Mauri .

* cited by examiner

Primary Examiner—Craig A. Renner
Assistant Examiner—Angel Castro
(74) Attorney, Agent, or Firm—Gray Cary Ware & Freidenrich LLP; Ervin F. Johnston

(57) ABSTRACT

A keeper layer promotes read signal symmetry of a giant magnetoresistive (GMR) read head without shunting sense current. The keeper layer is embedded in the first read gap layer of the read head and is completely insulated from the other layers of the spin valve sensor as well as from the first and second hard bias and lead layers connected to the sensor. A demagnetization field from the keeper layer opposes a demagnetization field from the pinned layer of the sensor so that fields acting on the free layer during a quiescent state of the sensor (sense current field conducted without an applied field from a rotating disk) can be balanced to a net value of zero so that the magnetic moment of the free layer maintains a parallel position with respect to the ABS.

67 Claims, 8 Drawing Sheets

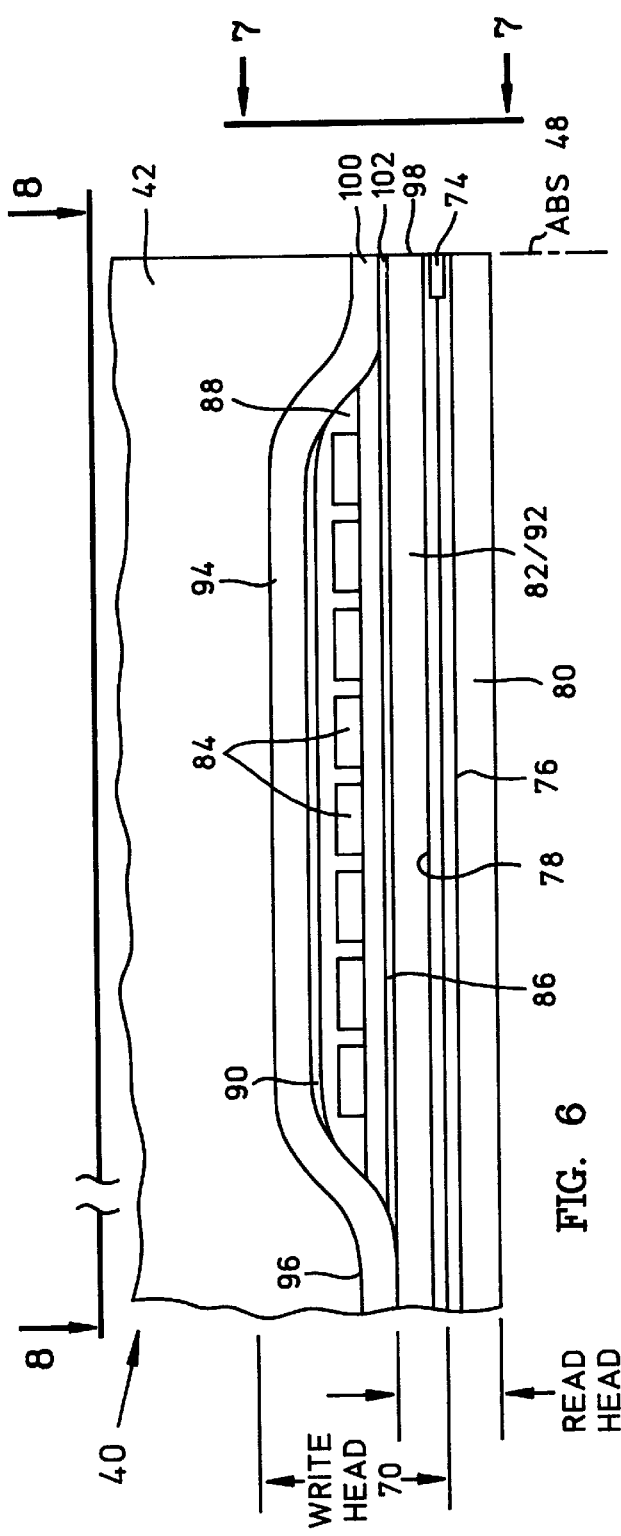
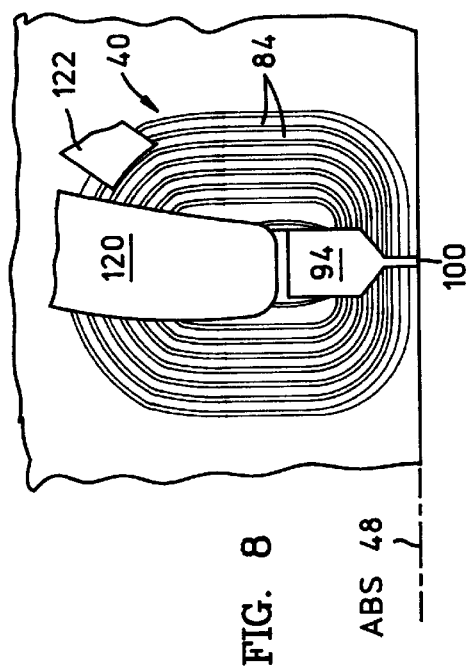
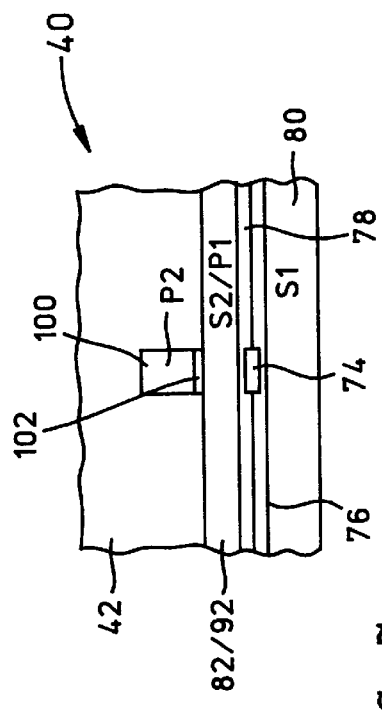
FIG. 6
FIG. 8
FIG. 7

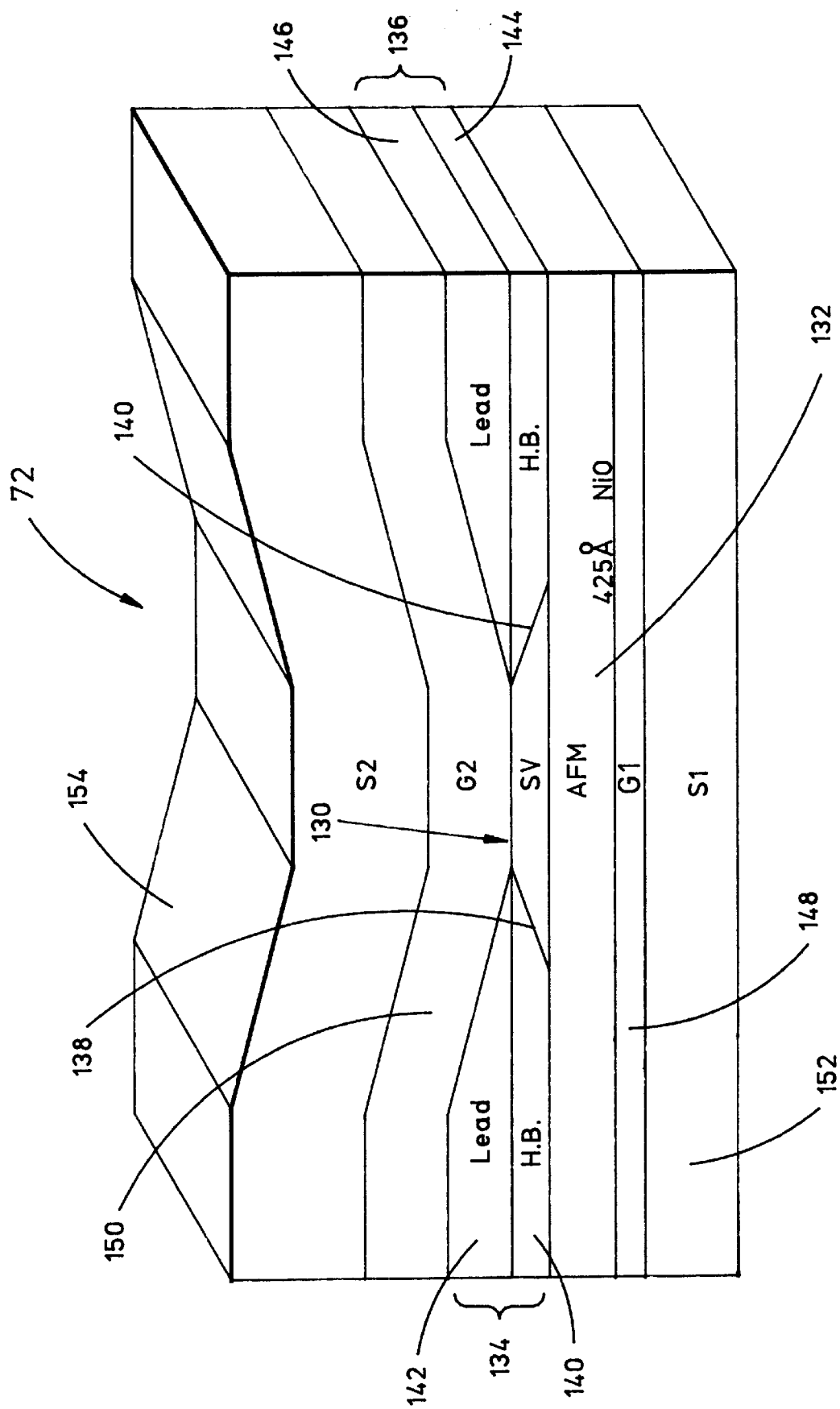
FIG. 9 (ABS)

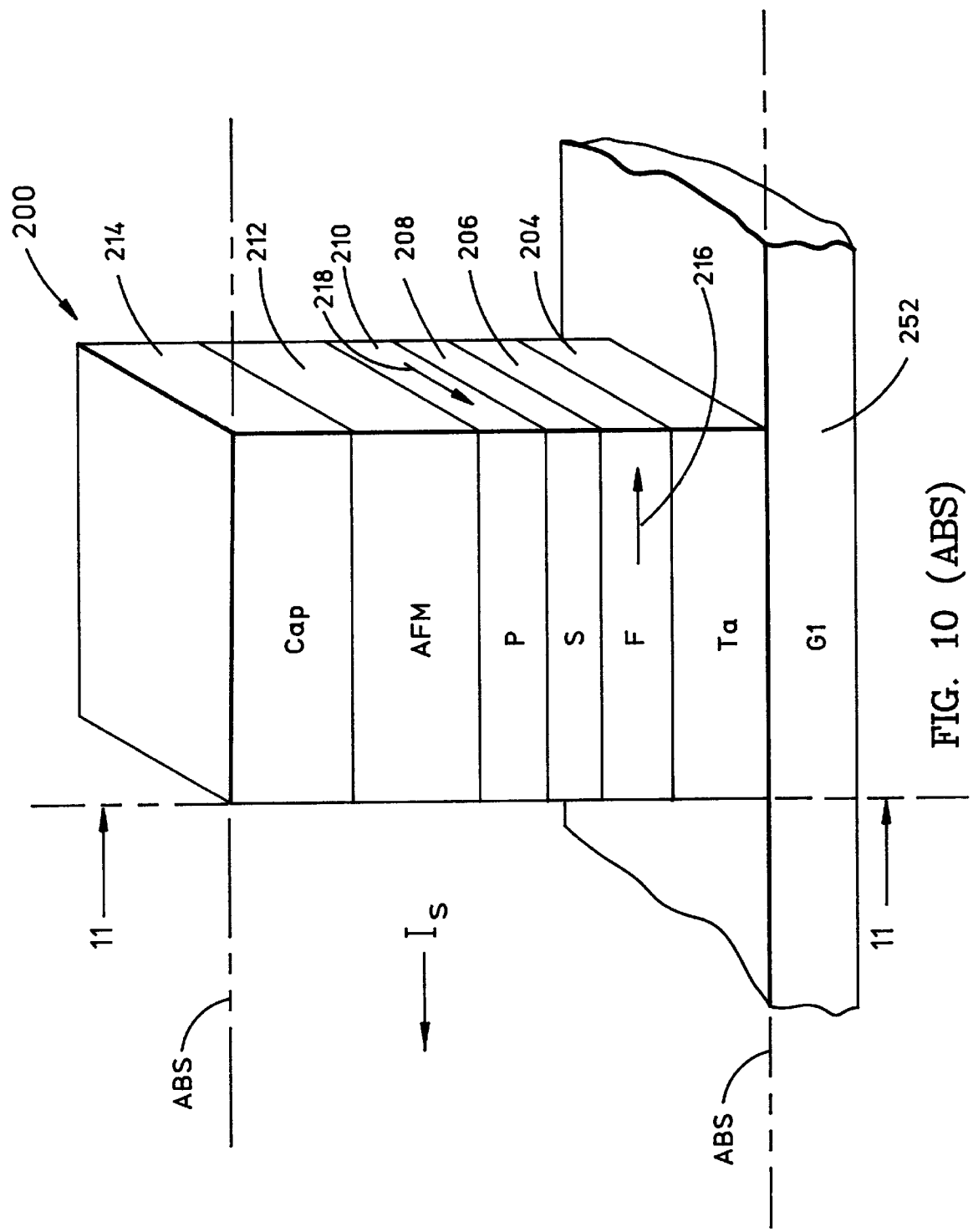
FIG. 10 (ABS)

KEEPER LAYER WITHOUT SENSE CURRENT SHUNTING IN A GIANT MAGNETORESISTIVE (GMR) HEAD

BACKGROUND OF THE INVENTION

1. Field of the Invention

The present invention relates to a giant magnetoresistive (GMR) head with a keeper layer that shunts no sense current and more particularly to a keeper layer that is electrically insulated from other layers of a spin valve sensor so that sense current is not conducted through the keeper layer.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetization of the pinned and free layers are parallel with respect to one another, scattering is minimal and when the magnetization of the pinned and free layers are antiparallel, scattering is maximized. Changes in scattering alter the resistance of the spin valve sensor in proportion to $\sin^2\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals. A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor.

It is important that the magnetic moment of the free layer be directed substantially parallel to the ABS when the sensor is in a quiescent state. The quiescent state occurs when the sense current is conducted through the sensor without an applied field from the rotating disk. The parallel position corresponds to a zero bias point on a transfer curve of the sensor. The transfer curve of the sensor can be plotted as GMR effect (ratio of change in resistance to resistance of the sensor) as a function of applied field. Applied fields from the rotating disk move the magnetic moment of the free layer up or down from the parallel position depending upon whether the applied field is positive or negative (representing ones and zeros in a digital computing scheme). This rotation, relative to the pinned magnetic moment of the pinned layer, causes scattering of spin dependent electrons at interfaces of certain layers in the sensor which results in resistance changes of the sensor. These resistance changes cause potential differences which can be processed by the processing circuitry as read signals.

During the quiescent state there are magnetic forces acting on the free layer that urge the magnetic moment of the free layer to rotate from the parallel position to the ABS. If the magnetic moment of the free layer is not parallel to the ABS in the quiescent state read signal asymmetry will occur which means that the potentials of the positive and negative read signals are unequal. This results in a reduced read signal. Accordingly, there is an ongoing effort to balance the magnetic forces acting on the free layer in the quiescent state. These magnetic forces are a ferromagnetic coupling field $H_C$ exerted by the pinned layer on the free layer, sense current fields $H_{SC}$ exerted by the pinned and spacer layers on the free layer and a demagnetization field $H_D$ exerted by the pinned layer on the free layer. The ferromagnetic coupling is antiparallel to the sense current and demagnetization fields. Unfortunately, in any practical sensor scheme the combination of the sense current and demagnetization fields is greater than the ferromagnetic coupling field which results read signal asymmetry. A reduced net demagnetization field on the free layer would promote read signal symmetry.

Another problem that can occur with spin valve sensors is a loss of exchange coupling between the pinning and pinned layers when the sensor is heated by an unwanted event. The sensor can encounter elevated thermal conditions by electrostatic discharge (ESD) from an object or person, or by contacting an asperity on a magnetic disk. When this occurs the blocking temperature (temperature at which magnetic spins of the layer can be easily moved by an applied magnetic field) of the antiferromagnetic layer can be exceeded, resulting in disorientation of its magnetic spins. The magnetic moment of the pinned layer is then no longer pinned in the desired direction.

Efforts continue to increase the spin valve effect of GMR heads. An increase in the spin valve effect equates to higher bit density (bits/square inch of the rotating magnetic disk) read by the read head. Promoting read signal symmetry with regard to the free layer and maintaining thermal stability of the pinning layer are important factors.

SUMMARY OF THE INVENTION

I investigated the use of a keeper layer for promoting read signal symmetry and stability of the pinning layer. A keeper layer is a ferromagnetic layer that is located between the free layer and the first gap layer of the read head. It has a magnetic moment that is directed antiparallel to the magnetic moment of the pinned layer. With this arrangement a demagnetization field of the keeper layer opposes the demagnetization field from the pinned layer on the free layer. There is also a sense current field from the keeper layer that opposes the demagnetization field from the pinned layer. Unfortunately, however, the keeper layer shunts a portion of the sense current since it is electrically conductive. A shunting of the sense current equates to a loss of read signal strength. Accordingly, the keeper layer should be thin so that it will not shunt as much sense current. This is a serious restraint in designing the thickness of the keeper layer thick enough to provide sufficient demagnetization field to counterbalance the other magnetic fields acting on the free layer. Further, lessening the thickness of the keeper layer lessens the demagnetization field from the keeper layer on the pinned layer for the purpose of promoting thermal stability of the pinning layer.

I have found that by electrically insulating the keeper layer from the other layers of the sensor that sense current is not shunted through the keeper layer and the thickness restraint is removed from designing so that the keeper layer can be designed sufficiently thick to counterbalance other magnetic fields acting on the free layer. Accordingly, read signal symmetry can be achieved without shunting sense current. Further, the typically thicker keeper layer increases thermal stability of the pinning layer. In a preferred embodiment the keeper layer is embedded in the first gap layer.

An object of the present invention is to provide a keeper layer for a GMR head that does not shunt sense current.

Another object is to provide a keeper layer that can be designed to completely balance other magnetic forces acting on a free layer of a spin valve sensor and promote thermal stability of the pinning layer of the sensor without a restraint on its thickness.

Other objects and advantages of the invention will become apparent upon reading the following description taken together with the accompanying drawings.

BRIEF DESCRIPTION OF THE DRAWINGS

FIG. 6 is a partial view of the slider and magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the second pole piece removed;

FIG. 9 is an isometric ABS illustration of a read head which employs the present spin valve (SV) sensor;

FIG. 10 is an ABS illustration of a spin valve sensor without a keeper layer;

DESCRIPTION OF THE PREFERRED EMBODIMENTS

Magnetic Disk Drive

Figure 1:
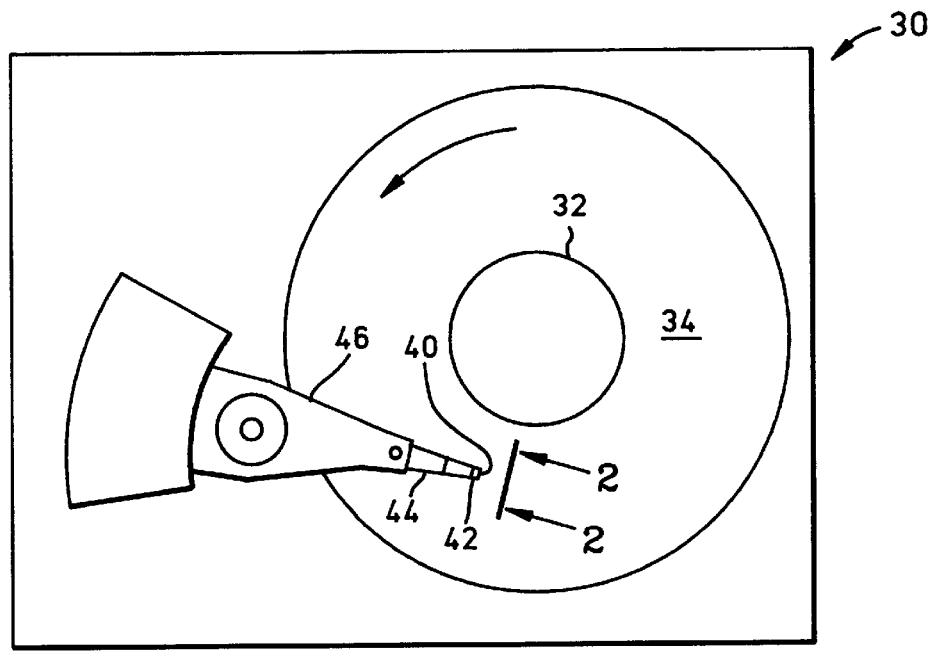
FIG. 1 is a planar view of an exemplary magnetic disk drive.
Figure 2:
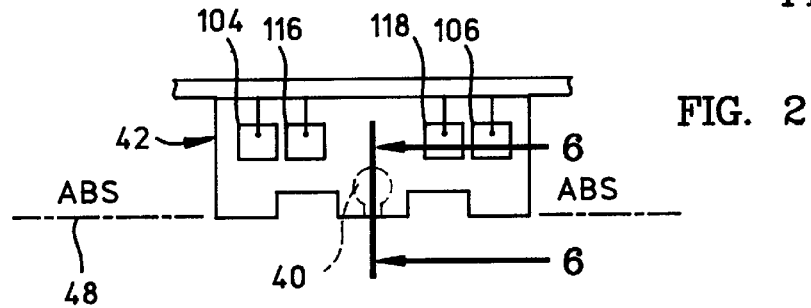
FIG. 2 is an end view of a slider with a magnetic head of the disk drive as seen in plane 2—2.
Figure 3:
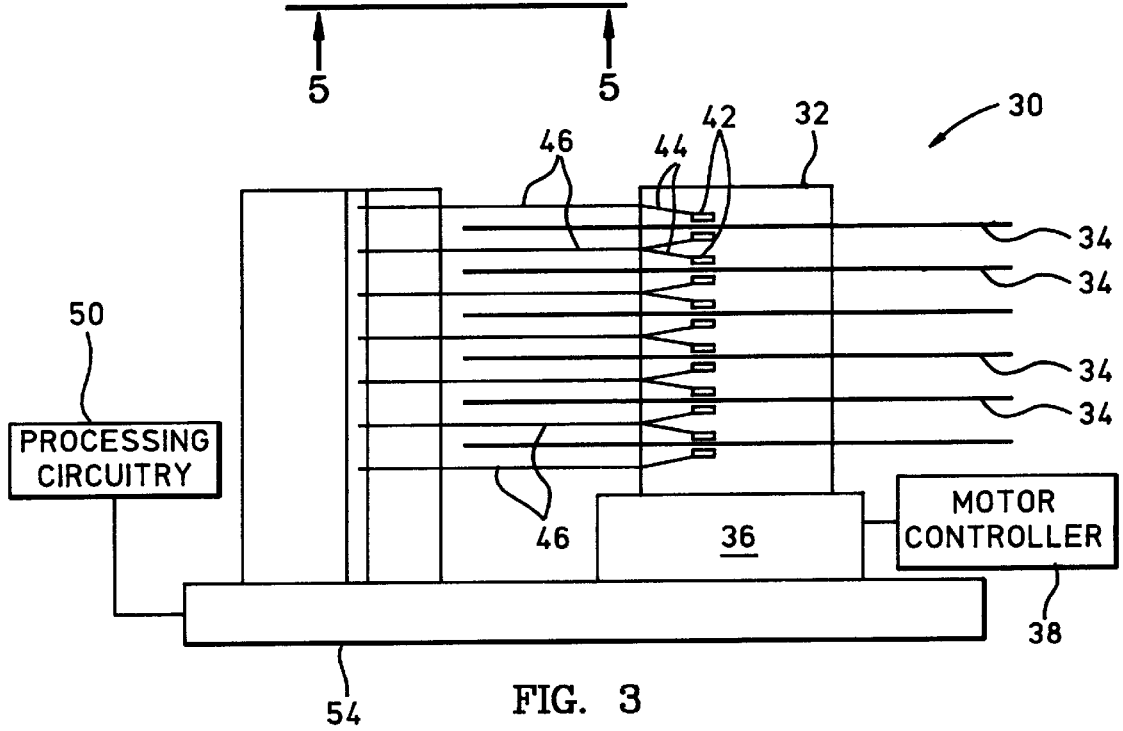
FIG. 3 is an elevation view of the magnetic disk drive wherein multiple disks and magnetic heads are employed.
Figure 4:
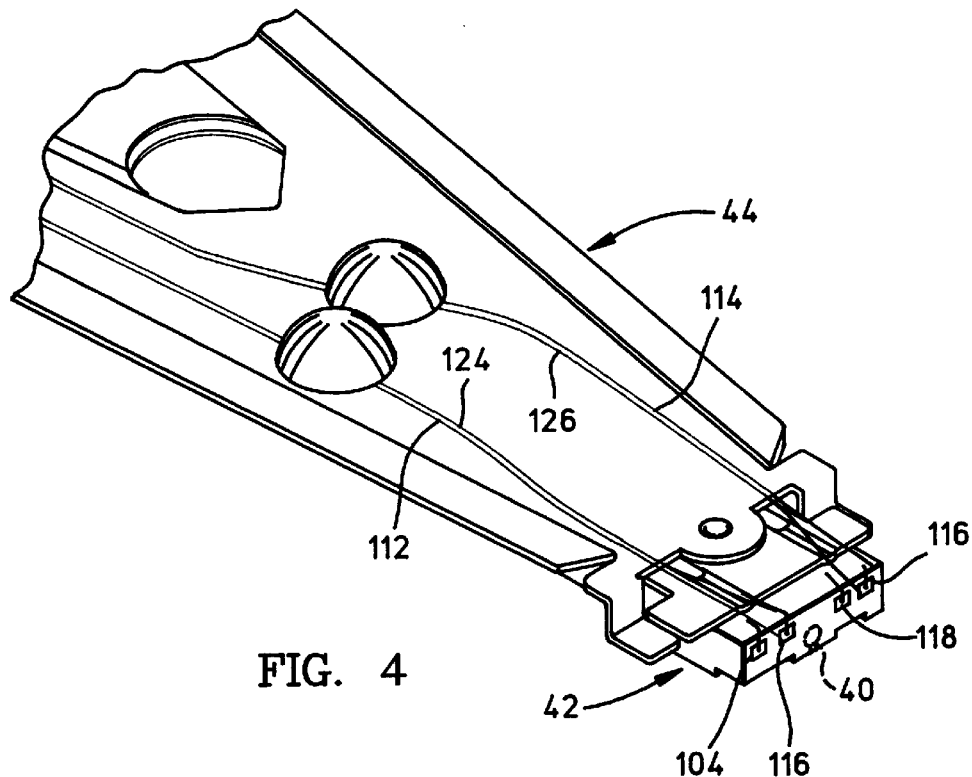
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
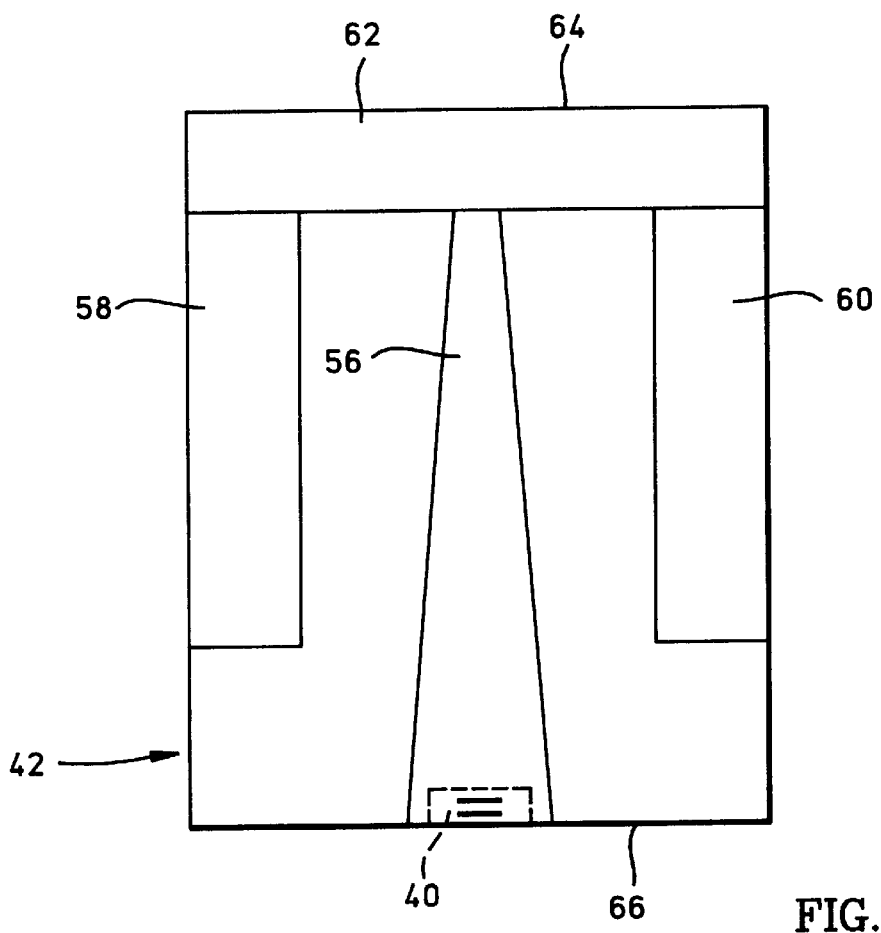
FIG. 5 is an ABS view of the magnetic head taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the merged MR head 40, which includes a write head portion 70 and a read head portion 72, the read head portion employing an AP pinned spin valve sensor 74 of the present invention. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

FIG. 9 is an isometric ABS illustration of the read head 72 shown in FIG. 6. The read head 72 has a spin valve sensor 130 which will be described in more detail hereinafter. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers include a first hard bias layer 140 and a first lead layer 142 and the second hard bias and lead layers 136 include a hard bias layer 144 and a lead layer 146. The hard bias layers 140 and 144 cause magnetic flux to extend longitudinally through the spin valve sensor 130 for stabilizing its magnetic domains. The spin valve sensor 130 and the first and second hard bias and lead layers 134 and 136 are located between nonmagnetic electrically insulative first and second read gap layers 148 and 150. The first and second gap layers 148 and 150 are, in turn, located between first and second shield layers 152 and 154.

Figure 11:
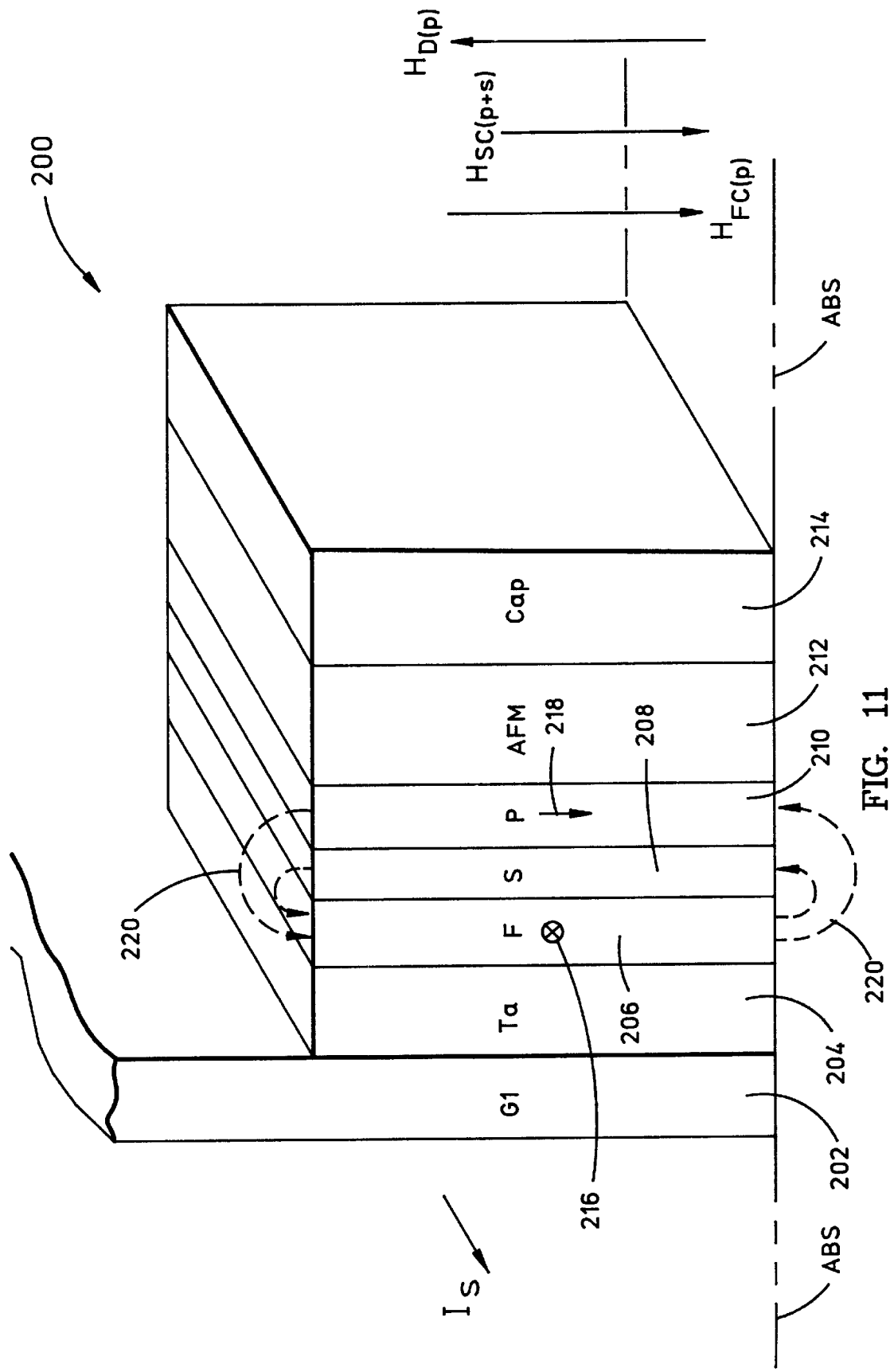
FIG. 11 is a view taken along plane 11—11 of FIG. 10.

A spin valve sensor 200 without a keeper layer is shown in FIGS. 10 and 11. The sensor 200 is formed on the first read gap layer 202 and may include a seedlayer 204 of tantalum (Ta), a free layer 206 of nickel iron (NiFe), a spacer layer 208 of copper (Cu), a pinned layer 210 of cobalt (Co), an antiferromagnetic pinning layer 212 of nickel manganese (NiMn) and a cap layer 214 of tantalum (Ta). The tantalum (Ta) seedlayer 204 is used for the purpose of epitaxial growth of the free layer 206 when it is sputtered on the seedlayer. This causes the crystalline structure of the free layer to simulate the crystalline structure of the tantalum seedlayer 204 and also prevents any possible contamination of aluminum oxide ($Al_2O_3$) typically employed for the first gap layer 202. Exemplary directions of the magnetic moments of the magnetic layers are magnetic moment 216 of the free layer is to the right parallel to the ABS and the magnetic moment 218 of the pinned layer is downward and perpendicular to the ABS. With these magnetic moments the sense current $I_S$ should be from left to right through the sensor. When the sense current $I_S$ is being conducted through the sensor without the application of any applied fields from a rotating magnetic disk the sensor is in a quiescent state. In a quiescent state the magnetic moment 216 of the free layer should be parallel to the ABS so that a bias point on a transfer curve of the free layer 206 is at a zero position. In order for the magnetic moment 216 of the free layer to be maintained parallel to the ABS it is important that the combined magnetic fields on the free layer in the quiescent state do not rotate the magnetic moment 216 from its parallel position.

The magnetic moments imposed on the free layer 206 during the quiescent state is illustrated in FIG. 11. A ferromagnetic coupling field $H_{FC(P)}$ is directed in a downward direction since the magnetic moment 218 of the pinned layer is directed in a downward direction, sense current fields $H_{FC(P+S)}$, caused by the sense current Is conduction through the pinned and spacer layers 210 and 208 is directed downwardly and a demagnetization field $H_{D(P)}$ 220 from the pinned layer 210 is directed upwardly. It is difficult to counterbalance the sense current fields $H_{SC(P+S)}$ and the demagnetization field $H_{D(P)}$ with the ferromagnetic coupling field $H_{FC(P)}$ in order to achieve a net zero field on the free layer 206.

If a ferromagnetic keeper layer is interposed between the first gap layer 202 and the seedlayer 204 the magnetic moment of this layer would be directed antiparallel to the magnetic moment 218 of the pinning layer so that demagnetization fields from the keeper layer and the pinned layer 210 oppose one another. This would help to reduce the net demagnetization field HD on the free layer 206. Unfortunately, the ferromagnetic keeper layer shunts some of the sense current thereby reducing the read signal. Therefore, there is a limitation on the thickness of the keeper layer for the purpose of reducing the effect of the demagnetization field of the pinning layer 210 on the free layer 206.

Figure 12:
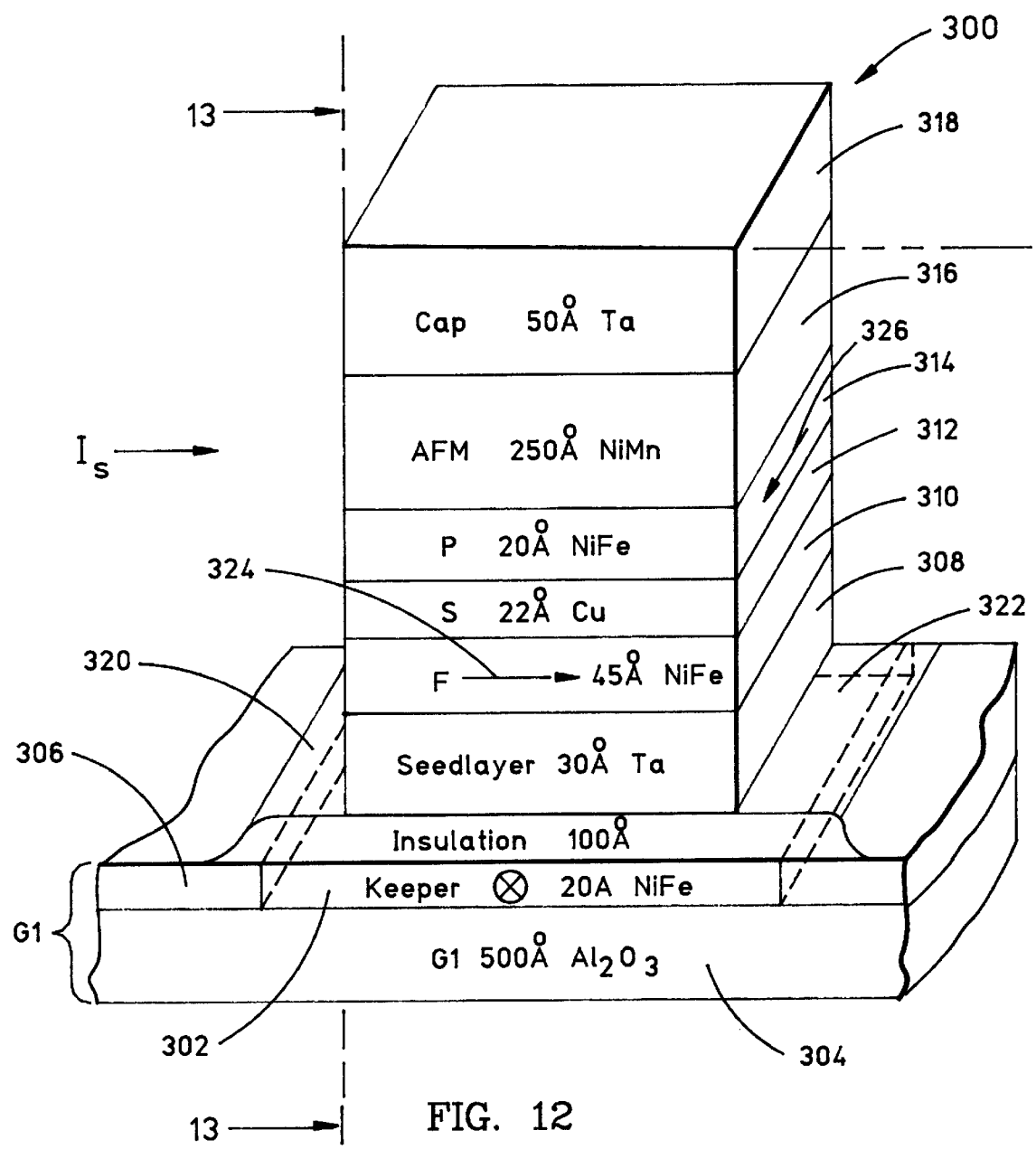
FIG. 12 is an ABS illustration of the present spin valve sensor with a keeper layer insulated from the sense current $I_S$.
Figure 13:
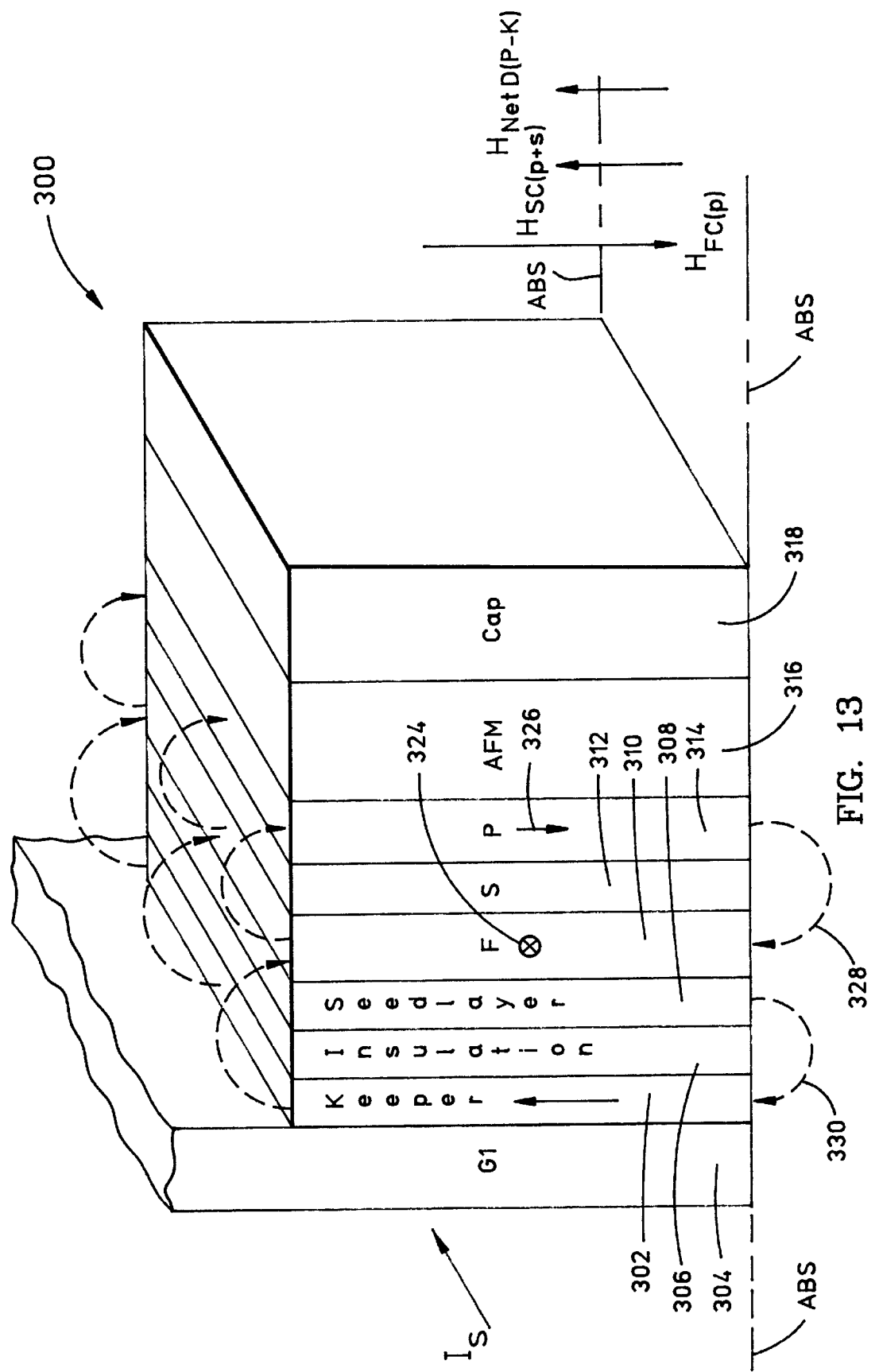
FIG. 13 is a view taken along plane 13—13 of FIG. 12.

In FIGS. 12 and 13 I have provided a spin valve sensor 300 which has a keeper layer 302 that does not shunt the sense current $I_S$. The keeper layer 302 is embedded in the first read gap layer 304 of the read head. The first gap layer 304 is typically aluminum oxide ($Al_2O_3$) and may be 500 Å thick. The keeper layer 302 is sputter deposited with any suitable masking such as bilayer photoresist lift-off processing. Located on top of the keeper layer 302 is an insulation layer 306 which may be sputter deposited on the keeper layer 302 and the first gap layer 304. In essence, the insulation layer 306 forms, along with the gap layer 304, a read gap thickness for the read head. The insulation layer may be any suitable material such as aluminum oxide ($Al_2O_3$), silicon dioxide ($SiO_2$), silicon nitride (SiN) or nickel oxide (NiO). A preferred thickness range for the insulation layer 306 is 50 Å to 150 Å with the preferred thickness being 100 Å. The preferred material for the keeper layer is nickel iron (NiFe) with a thickness range of 10 Å to 40 Å with a preferred thickness of 20 Å.

The spin valve sensor 300 further includes a seedlayer 308, a free layer 310, a spacer layer 312, a pinned layer 314, an antiferromagnetic (AFM) pinning layer 316 and a cap layer 318. The seedlayer 308 is preferably tantalum (Ta) with a thickness range of 10 Å to 50 Å with a preferred thickness of 30 Å, the free layer is preferably nickel iron (NiFe) with a thickness range of 30 Å to 60 Å with a preferred thickness of 45 Å, the spacer layer is preferably copper (Cu) with a thickness range of 18 Å to 30 Å with a preferred thickness being 22 Å, the pinned layer is preferably cobalt (Co) with a thickness range of 10 Å to 40 Å with a preferred thickness being 20 Å, the pinning 316 is preferably nickel manganese (NiMn) with a thickness range of 200 Å to 300 Å with a preferred thickness of 250 Å, and the cap layer is preferably tantalum (Ta) with a thickness range of 30 Å to 70 Å with a preferred thickness of 50 Å. Other suitable antiferromagnetic materials for the pinning layer 316 may be iridium manganese (IrMn), platinum manganese (PtMn), platinum palladium manganese (PtPdMn) and ruthenium rhodium manganese (RuRhMn). It should be noted that the keeper layer 302 is preferably the same thickness as the pinned layer 314 so that a demagnetization field from the keeper layer completely counterbalances a demagnetization field from the pinned layer 314 on the free layer 310. It should further be noted that the keeper layer 302 may be wider than the other layers 308, 310, 312, 314, 316 and 318 of the spin valve sensor 300 so that the portions 320 and 322 of the first insulation layer 306 are substantially planarized for construction of the hard bias and lead layers 134 and 136 shown in FIG. 9. It is preferred that the keeper layer 302 extend 0.5 μm on each side edge of the seedlayer 308 for this purpose.

The magnetic moment 324 of the free layer is shown parallel to the ABS and to the right. Optionally, the magnetic moment 324 could be directed to the left. The magnetic moment 326 of the pinned layer is shown directed perpendicular to the ABS in the downward direction. Optionally, the direction of the magnetic moment 326 could be directed upwardly away from the ABS. For the directions of the magnetic moments 324 and 326 in FIG. 12 the sense current Is should be directed from left to right, as shown. In the quiescent state various fields will be exerted on the free layer 310 by the pinned layer 314, the keeper layer 302 and the spacer layer 312, which are shown in FIG. 13.

FIG. 13 is a side view of the sensor taken along plane 13—13 of FIG. 12. A ferromagnetic coupling field $H_{FC(P)}$ is exerted on the free layer 310 by the pinned layer 314. This field is directed in a downward direction because the magnetic moment 326 of the pinned layer is directed in a downward direction. Sense current fields $H_{FC(P+S)}$ are exerted on the free layer 310 by the pinned and spacer layers 314 and 312. Because of the direction of the sense current $I_S$ the sense current fields are directed upwardly on the free layer 310, as shown. A demagnetization field 328 is exerted on the free layer 310 by the pinned layer 314 and a demagnetization field 330 is exerted on the free layer 310 by the keeper layer 302. It should be noted that these demagnetization fields are in opposite directions and, if equal, would completely counterbalance each other providing a net demagnetization field of zero on the free layer 310. The net demagnetization field $H_{NET\ D(P-K)}$ is shown with some value which may be necessary if the ferromagnetic coupling HFC and the sense current field $H_{FC(P+S)}$ do not completely counterbalance one another. In a preferred embodiment the ferromagnetic coupling field $H_{FC(P)}$ and the sense current fields $H_{FC(P+S)}$ completely counterbalance one another and the demagnetization fields 328 and 330 completely counterbalance one another so as to produce a net demagnetization field $H_{NETD(P-K)}$ of zero. With this arrangement there are no net fields on the free layer 310 in the quiescent state that urge the magnetic moment 324 of the free layer to move from its parallel position with respect to the ABS. With this scheme the thicknesses of the keeper and pinned layers 302 and 314 would be equal with a preferred material for each being nickel iron (NiFe). It should be noted that there is no sense current field from the keeper layer 302 on the free layer 310 since there is no sense current $I_S$ conducted through the keeper layer 302.

It should be noted that the demagnetization fields from the keeper layer 302 is also imposed on the pinned layer 314. This enhances the pinning of the magnetic moment 326 of the pinned layer in the downward direction which direction is necessary for the spin valve effect to occur. Should the sensor encounter a high temperature, due to electrostatic discharge (ESD) or contact with an asperity on the rotating magnetic disk, the pinning layer 316 may be heated at or above its blocking temperature which allows its magnetic spins to easily rotate in the presence of extraneous fields. When this occurs the demagnetization field from the keeper layer 302 keeps the magnetic moment 326 of the pinned layer directed downwardly so that when the pinning layer 316 cools off its magnetic spins will align with the magnetic spins of the pinned layer back to the original direction. Accordingly, the keeper layer 302 serves a double function of promoting read signal symmetry as well as stabilizing the pinning layer 316.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A spin valve sensor that has an air bearing surface (ABS) comprising:
    an antiferromagnetic pinning layer that has magnetic spins oriented in a first direction;
    a ferromagnetic pinned layer exchange coupled to the pinning layer and having a magnetic moment that is pinned by the pinning layer in said first direction;
    a nonmagnetic electrically conductive spacer film;
    a ferromagnetic free layer that has a magnetic moment;
    the spacer film being located between the pinned layer and the free layer;
    a ferromagnetic keeper layer having a magnetic that is directed antiparallel to said first direction; and
    a nonmagnetic electrically insulative insulation layer between the keeper layer and the free layer and electrically insulating the keeper layer from all other layers of the sensor so that keeper layer does not shunt a sense current.

2. A spin valve sensor as claimed in claim 1 wherein the insulation layer is part of a first nonmagnetic electrical insulative first gap layer.

3. A spin valve sensor as claimed in claim 2 wherein a demagnetization field of the keeper layer completely counterbalances a demagnetization field of the pinned layer on the free layer.

4. A spin valve sensor as claimed in claim 3 wherein a ferromagnetic coupling field from the pinned layer completely counterbalances the sense current fields from the pinned and spacer layers on the free layer.

5. A spin valve sensor as claimed in claim 2 wherein at the ABS the keeper layer is wider than any of the other layers of the spin valve sensor.

6. A spin valve sensor as claimed in claim 5 wherein at the ABS the keeper layer is at least 1.0 μm wider than the other layers of the spin valve sensor.

7. A spin valve sensor as claimed in claim 2 wherein the insulation layer is selected from the group comprising aluminum oxide ($Al_2O_3$), silicon dioxide ($SiO_2$), silicon nitride (SiN) and nickel oxide (NiO).

8. A spin valve sensor as claimed in claim 2 wherein the pinned and keeper layers are the same thickness and are of the same material.

9. A spin valve sensor as claimed in claim 8 wherein each of the pinned and keeper layers is nickel iron (NiFe).

10. A spin valve sensor as claimed in claim 9 wherein the keeper layer is wider at the ABS than any of the other layers of the spin valve sensor.

11. A spin valve sensor as claimed in claim 10 wherein at the ABS the keeper layer is at least 1.0 μm wider than the other layers of the spin valve sensor.

12. A spin valve sensor as claimed in claim 11 wherein the insulation layer is aluminum oxide ($Al_2O_3$).

13. A spin valve sensor as claimed in claim 12 including:
    a tantalum (Ta) layer between the keeper layer and the free layer.

14. A spin valve sensor as claimed in claim 13 wherein a demagnetization field of the keeper layer completely counterbalances a demagnetization field of the pinned layer on the free layer.

15. A spin valve sensor as claimed in claim 14 wherein a ferromagnetic coupling field from the pinned layer completely counterbalances the sense current fields from the pinned and spacer layers on the free layer.

16. A spin valve sensor as claimed in claim 15 wherein the pinning layer is nickel manganese.

17. A magnetic head that has an air bearing surface (ABS) comprising:
    a spin valve sensor partially bounded by said ABS and first and second side edges;
    first and second hard bias and lead layers connected to the first and second side edges respectively;
    first and second nonmagnetic electrically insulative gap layers;

the spin valve sensor and the first and second hard bias and lead layers being sandwiched between the first and second gap layers;

first and second ferromagnetic shield layers;

the first and second gap layers being sandwiched between the first and second ferromagnetic shield layers;

the spin valve sensor including:
- an antiferromagnetic pinning layer that has magnetic spins oriented in a first direction;
- a ferromagnetic pinned layer exchange coupled to the pinning layer and having a magnetic moment that is pinned by the pinning layer in said first direction;
- a nonmagnetic electrically conductive spacer film;
- a ferromagnetic free layer that has a magnetic moment that is free to rotate in response to applied fields;
- the spacer film being located between the pinned layer and the free layer so that upon conducting a sense current through the sensor spin dependent scattering occurs at the interface of the pinned and spacer layers as a function of the applied field to produce a giant magnetoresistive (GMR) effect;
- a ferromagnetic keeper layer having a magnetic moment that is directed antiparallel to said first direction; and
- the keeper layer being embedded in the first gap layer and electrically insulated from all other layers of the sensor and the first and second hard bias and lead layers so that the keeper layer does not shunt said sense current, whereby upon conducting the sense current through the sensor a demagnetization field from the keeper layer on the free layer counterbalance a demagnetization field from the pinned layer on the free layer for promoting read signal symmetry.

18. A magnetic head as claimed in claim 17 comprising:
a write head including:
a write gap layer and an insulation stack with a coil layer embedded therein on the second shield layer so that the second shield layer also functions as a first pole piece for the write head; and
a second pole piece layer on the insulation stack and the write gap layer and connected at a back gap to the first pole piece.

19. A magnetic write head as claimed in claim 18 wherein the insulation layer is part of a first nonmagnetic electrical insulative first gap layer.

20. A magnetic write head as claimed in claim 19 wherein a demagnetization field of the keeper layer completely counterbalances a demagnetization field of the pinned layer on the free layer.

21. A magnetic write head as claimed in claim 19 wherein the keeper layer is wider at the ABS than any of the other layers of the spin valve sensor.

22. A magnetic write head as claimed in claim 19 wherein the pinned and keeper layers are the same thickness and are of the same material.

23. A magnetic write head as claimed in claim 22 wherein each of the pinned and keeper layers is nickel iron (NiFe).

24. A magnetic write head as claimed in claim 23 wherein the insulation layer is aluminum oxide ($Al_2O_3$).

25. A magnetic disk drive that includes at least one magnetic head that has an air bearing surface (ABS), the disk drive comprising:
the magnetic head including a combined read head and write head;
the read head including:
a spin valve sensor partially bounded by said ABS and first and second side edges;
first and second hard bias and lead layers connected to the first and second side edges respectively of the sensor for magnetically stabilizing the sensor and conducting a sense current therethrough;
first and second nonmagnetic electrically insulative gap layers;
the spin valve sensor and the first and second hard bias and lead layers being sandwiched between the first and second gap layers;
first and second ferromagnetic shield layers;
the first and second gap layers being sandwiched between the first and second ferromagnetic shield layers;
the spin valve sensor including:
- an antiferromagnetic pinning layer that has magnetic spins oriented in a first direction;
- a ferromagnetic pinned layer exchange coupled to the pinning layer and having a magnetic moment that is pinned by the pinning layer in said first direction;
- a nonmagnetic electrically conductive spacer film;
- a ferromagnetic free layer that has a magnetic moment that is free to rotate in response to an applied field;
- the spacer film being located between the pinned layer and the free layer so that upon conducting the sense current through the sensor spin dependent scattering occurs at the interface of the pinned and spacer layers as a function of an applied field to produce a giant magnetoresistive (GMR) effect;
- a ferromagnetic keeper layer that has a magnetic moment that is antiparallel to said first direction; and
- the keeper layer being embedded in the first gap layer and electrically insulated from all other layers of the sensor and the first and second hard bias and lead layers so that the keeper layer does not shunt said sense current, the write head including:

first and second pole piece layers and a write gap layer;
the first and second pole piece layers being separated by the write gap layer at the ABS and connected at a back gap that is recessed rearwardly in the head from the ABS;
an insulation stack having at least first and second insulation layers;
at least one coil layer embedded in the insulation stack; and
the insulation stack and the at least one coil layer being located between the first and second pole piece layers;
the second shield layer and the first pole piece layer being a common layer;
a housing;
a magnetic disk rotatably supported in the housing;
a support mounted in the housing for supporting the magnetic head with its ABS facing the magnetic disk so that the magnetic head is in a transducing relationship with the magnetic disk;
means for rotating the magnetic disk;
positioning means connected to the support for moving the magnetic head to multiple positions with respect to said magnetic disk; and
processing means connected to the magnetic head for applying said sense current to the write head, applying a write current to said coil layer and exchanging signals with the magnetic head, connected to the means for rotating the magnetic disk for controlling rotation of the magnetic disk and connected to the positioning means for positioning the magnetic head.

whereby, upon conducting the sense current through the sensor, a demagnetization field from the keeper layer on the free layer counterbalances a demagnetization field from the pinned layer on the free layer for promoting read signal symmetry.

26. A spin valve sensor as claimed in claim 25 wherein the insulation layer is part of a first nonmagnetic electrical insulative first gap layer.

27. A spin valve sensor as claimed in claim 26 wherein a demagnetization field of the keeper layer completely counterbalances a demagnetization field of the pinned layer on the free layer.

28. A magnetic write head as claimed in claim 26 wherein the keeper layer is wider at the ABS than any of the other layers of the spin valve sensor.

29. A magnetic write head as claimed in claim 26 wherein the pinned and keeper layers are the same thickness and are of the same material.

30. A magnetic write head as claimed in claim 29 wherein each of the pinned and keeper layers is nickel iron (NiFe).

31. A magnetic write head as claimed in claim 30 wherein the insulation layer is aluminum oxide ($Al_2O_3$).

32. A method of making a spin valve sensor that has an air bearing surface (ABS) comprising:

forming a ferromagnetic keeper layer having a magnetic moment oriented in a first direction;

forming an insulation layer on the keeper layer so as to electrically insulate the keeper layer from all other layers of the spin valve sensor;

forming a ferromagnetic free layer on the insulation layer;

forming a nonmagnetic electrically insulative spacer layer on the free layer;

forming a ferromagnetic pinned layer on the spacer layer that has a magnetic moment; and forming an antiferromagnetic pinning layer on the pinned layer that pins a direction of the magnetic moment of the pinned layer in a direction that is antiparallel to said first direction.

33. A method as claimed in claim 32 wherein the insulation layer is formed as part of a first nonmagnetic electrically insulative first gap layer.

34. A method as claimed in claim 33 wherein the keeper layer is wider at the ABS than any of the other layers of the spin valve sensor.

35. A method as claimed in claim 34 wherein at the ABS the keeper layer is at least 1.0 µm wider than the other layers of the spin valve sensor.

36. A method as claimed in claim 33 wherein the insulation layer is formed from one of the group comprising aluminum oxide ($Al_2O_3$), silicon dioxide ($SiO_2$), silicon nitride (SiN) and nickel oxide (NiO).

37. A method as claimed in claim 33 wherein the pinned and keeper layers are the same thickness and are of the same material.

38. A method as claimed in claim 37 wherein each of the pinned and keeper layers is nickel iron (NiFe).

39. A method as claimed in claim 38 wherein the keeper layer is wider at the ABS than any of the other layers of the spin valve sensor.

40. A method as claimed in claim 39 wherein at the ABS the keeper layer is at least 1.0 µm wider than the other layers of the spin valve sensor.

41. A method as claimed in claim 40 wherein the insulation layer is formed from aluminum oxide ($Al_2O_3$).

42. A method as claimed in claim 41 wherein a tantalum (Ta) layer is formed between the keeper layer and the free layer.

43. A method as claimed in claim 33 including:

conducting a sense current through the sensor so that a demagnetization field from the keeper layer on the free layer counterbalances a demagnetization field from the pinned layer on the free layer for promoting read signal symmetry without shunting sense current through the keeper layer.

44. A method of making a magnetic head that has an air bearing surface (ABS) comprising:

forming a ferromagnetic first shield layer;

forming a nonmagnetic electrically insulative first gap layer on the first shield layer;

forming a spin valve sensor on the first gap layer with an ABS site and first and second side edges including:

forming a ferromagnetic keeper layer on the first gap layer that has a magnetic moment oriented in a first direction;

forming an insulation layer on the keeper layer so as to electrically insulate it from all other layers of the spin valve sensor;

forming a ferromagnetic free layer on the insulation layer with a magnetic moment that is free to rotate in response to an applied field;

forming a nonmagnetic electrically insulative spacer layer on the free layer;

forming a ferromagnetic pinned layer on the spacer layer with a magnetic moment;

forming an antiferromagnetic pinning layer on the pinned layer that pins a direction of the magnetic moment of the pinned layer in a direction that is antiparallel to said first direction, and forming the free layer, the spacer layer, the pinned layer and the pinning layer with first and second side edges;

forming first and second hard bias and lead layers that are connected to said first and second side edges;

forming a nonmagnetic electrically insulative second gap layer on the spin valve sensor and the first and second hard bias and lead layers; and forming a ferromagnetic second shield layer on the second gap layer.

45. A method as claimed in claim 44 comprising:

forming a write head including::

forming a write gap layer and an insulation stack with a coil layer embedded therein on the second shield layer so that the second shield layer also functions as a first pole piece for the write head; and forming a second pole piece layer on the insulation stack and the write gap layer and connected at a back gap to the first pole piece.

46. A method as claimed in claim 45 wherein the insulation layer is formed as part of a first nonmagnetic electrically insulative first gap layer.

47. A method as claimed in claim 46 wherein the keeper layer is wider at the ABS than any of the other layers of the spin valve sensor.

48. A method as claimed in claim 47 wherein at the ABS the keeper layer is at least 1.0 µm wider than the other layers of the spin valve sensor.

49. A method as claimed in claim 46 wherein the insulation layer is formed from one of the group comprising aluminum oxide ($Al_2O_3$), silicon dioxide ($SiO_2$), silicon nitride (SiN) and nickel oxide (NiO).

50. A method as claimed in claim 46 wherein the pinned and keeper layers are the same thickness and are of the same material.

51. A method as claimed in claim 50 wherein each of the pinned and keeper layers is nickel iron (NiFe).

52. A method as claimed in claim 51 wherein the keeper layer is wider at the ABS than any of the other layers of the spin valve sensor.

53. A method as claimed in claim 52 wherein at the ABS the keeper layer is at least 1.0 μm wider than the other layers of the spin valve sensor.

54. A method as claimed in claim 53 wherein the insulation layer is formed from aluminum oxide ($Al_2O_3$).

55. A method as claimed in claim 54 wherein a tantalum (Ta) layer is formed between the keeper layer and the free layer.

56. A method as claimed in claim 45 including:
conducting a sense current through the sensor so that a demagnetization field from the keeper layer on the free layer counterbalances a demagnetization field from the pinned layer on the free layer for promoting read signal symmetry without shunting sense current through the keeper layer.

57. A method of making a magnetic disk drive that includes at least one magnetic head with read and write heads and an air bearing surface (ABS) comprising:
forming the read head by:
forming a ferromagnetic first shield layer;
forming a nonmagnetic electrically insulative first gap layer on the first shield layer;
forming a spin valve sensor on the first gap layer partially bounded by an ABS and first and second side edges;
the forming of the spin valve sensor including:
forming a ferromagnetic keeper layer on the first gap layer that has a magnetic moment directed in a first direction;
forming an insulation layer on the keeper layer so as to electrically insulate the keeper layer from all other layers of the spin valve sensor;
forming a ferromagnetic free layer on the insulation layer with a magnetic moment that is free to rotate in response to an applied field;
forming a nonmagnetic electrically insulative spacer layer on the free layer;
forming a ferromagnetic pinned layer on the spacer layer that has a magnetic moment;
forming an antiferromagnetic pinning layer on the pinned layer for pinning a direction of the magnetic moment of the pinned layer antiparallel to said first direction; and
forming the free layer, the spacer layer, the pinned layer and the pinning layer with first and second side edges;
forming first and second hard bias and lead layers connected to said first and second side edges;
forming a nonmagnetic electrically insulative second gap layer on the spin valve sensor and the first and second hard bias and lead layers;
forming a ferromagnetic second shield layer on the second gap layer; and
forming the write head by:
forming a write gap layer and an insulation stack with a coil layer embedded therein on the second shield layer so that the second shield layer also functions as a first pole piece for the write head; and
forming a second pole piece layer on the insulation stack and the write gap and connected at a back gap to the first pole piece;
providing a housing;
rotatably supporting a magnetic disk in the housing;
providing a support in the housing for supporting the magnetic head with its ABS facing the magnetic disk so that the magnetic head is in a transducing relationship with the magnetic disk;
providing means for rotating the magnetic disk;
providing positioning means connected to the support for moving the magnetic head to multiple positions with respect to said magnetic disk; and
providing processing means connected to the magnetic head, to the means for rotating the magnetic disk and to the positioning means for exchanging signals with the merged magnetic head, including conducting a sense current to the spin valve sensor and conducting a write current to the coil layer, for controlling movement of the magnetic disk and for controlling the position of the magnetic head.

58. A method as claimed in claim 57 wherein the insulation layer is formed as part of a first nonmagnetic electrically insulative first gap layer.

59. A method as claimed in claim 58 wherein the keeper layer is wider at the ABS than any of the other layers of the spin valve sensor.

60. A method as claimed in claim 59 wherein at the ABS the keeper layer is at least 1.0 μm wider than the other layers of the spin valve sensor.

61. A method as claimed in claim 58 wherein the insulation layer is formed from one of the group comprising aluminum oxide ($Al_2O_3$), silicon dioxide ($SiO_2$), silicon nitride (SiN) and nickel oxide (NiO).

62. A method as claimed in claim 58 wherein the pinned and keeper layers are the same thickness and are of the same material.

63. A method as claimed in claim 62 wherein each of the pinned and keeper layers is nickel iron (NiFe).

64. A method as claimed in claim 63 wherein the keeper layer is wider at the ABS than any of the other layers of the spin valve sensor.

65. A method as claimed in claim 64 wherein at the ABS the keeper layer is at least 1.0 μm wider than the other layers of the spin valve sensor.

66. A method as claimed in claim 65 wherein the insulation layer is formed from aluminum oxide ($Al_2O_3$).

67. A method as claimed in claim 66 wherein a tantalum (Ta) layer is formed between the keeper layer and the free layer.

* * * * *